(12) United States Patent
Tanaka

(10) Patent No.: US 7,783,422 B2
(45) Date of Patent: Aug. 24, 2010

(54) NAVIGATION DEVICE AND METHOD OF NAVIGATING VEHICLE

(75) Inventor: Yutaka Tanaka, Anjo (JP)

(73) Assignee: DENSO CORPORATION, Kariya (JP)

(*) Notice: Subject to any disclaimer, the term of this patent is extended or adjusted under 35 U.S.C. 154(b) by 748 days.

(21) Appl. No.: 11/715,422

(22) Filed: Mar. 8, 2007

(65) Prior Publication Data

US 2007/0233380 A1 Oct. 4, 2007

(30) Foreign Application Priority Data

Mar. 29, 2006 (JP) ............................... 2006-090911

(51) Int. Cl.
*G01C 21/32* (2006.01)
*G06T 15/70* (2006.01)

(52) U.S. Cl. ..................... 701/211; 701/208; 382/104

(58) Field of Classification Search ................. 701/211, 701/208, 207, 209; 382/103, 104; 340/995.1; 345/473, 630
See application file for complete search history.

(56) References Cited

U.S. PATENT DOCUMENTS

| | | | |
|---|---|---|---|
| 6,018,697 A | 1/2000 | Morimoto et al. | |
| 6,199,014 B1 | 3/2001 | Walker et al. | |
| 6,222,583 B1 | 4/2001 | Matsumura et al. | |
| 6,356,840 B2* | 3/2002 | Kusama | 701/211 |
| 6,360,168 B1* | 3/2002 | Shimabara | 701/211 |
| 6,470,265 B1* | 10/2002 | Tanaka | 701/208 |
| 6,977,630 B1* | 12/2005 | Donath et al. | 345/7 |
| 2001/0029428 A1 | 10/2001 | Huertgen et al. | |
| 2002/0049534 A1* | 4/2002 | Yuda et al. | 701/209 |
| 2004/0059500 A1 | 3/2004 | Nakano | |
| 2004/0236506 A1 | 11/2004 | Kolb et al. | |
| 2005/0209776 A1 | 9/2005 | Ogino | |
| 2005/0273256 A1* | 12/2005 | Takahashi | 701/211 |
| 2007/0143009 A1 | 6/2007 | Nomura et al. | |
| 2008/0077322 A1 | 3/2008 | Sumizawa | |
| 2008/0195315 A1* | 8/2008 | Hu et al. | 701/212 |

(Continued)

FOREIGN PATENT DOCUMENTS

DE 10313743 10/2004

(Continued)

OTHER PUBLICATIONS

Office Action dated Mar. 23, 2009 issued from the Chinese Patent Office for counterpart application No. 200710088426.7 (English translation enclosed).

(Continued)

*Primary Examiner*—Tan Q Nguyen
(74) *Attorney, Agent, or Firm*—Posz Law Group, PLC

(57) ABSTRACT

A navigation device includes a position detector, a controller, a display portion, an imaging portion and an image processor. The imaging portion images a forward view in front of the vehicle as a forward image from a predetermined distance before a guidance point. The image processor extracts and analyzes visual information of an on-road object from the forward image. The controller specifies a position of the on-road object based on the visual information and map information. The display portion displays and highlights an image of the on-road object at a true position in a road map image, when the position of the on-road object corresponds to the guidance point.

12 Claims, 6 Drawing Sheets

U.S. PATENT DOCUMENTS

2008/0273757 A1* 11/2008 Nakamura et al. .......... 382/104

FOREIGN PATENT DOCUMENTS

| EP | 1378724 | 1/2004 |
| --- | --- | --- |
| JP | A-8-247775 | 9/1996 |
| JP | A-10-177699 | 6/1998 |
| JP | A-10-339646 | 12/1998 |
| JP | A-11-065431 | 3/1999 |
| JP | A-11-271074 | 10/1999 |
| JP | A-2001-74477 | 3/2001 |
| JP | A-2001-324348 | 11/2001 |
| JP | A-2002-243469 | 8/2002 |
| JP | A-2006-052972 | 2/2006 |
| WO | 2005/043232 A2 | 5/2005 |

OTHER PUBLICATIONS

Office Action dated Aug. 25, 2009 from German Patent Office in corresponding DE application No. 102007014674.6-54 (and English translation).

* cited by examiner

NAVIGATION DEVICE AND METHOD OF NAVIGATING VEHICLE

CROSS REFERENCE TO RELATED APPLICATION

This application is based on Japanese Patent Application No. 2006-90911 filed on Mar. 29, 2006, the disclosure of which is incorporated herein by reference in its entirety.

BACKGROUND OF THE INVENTION

1. Field of the Invention

The present invention relates to a navigation device for performing a route guidance and a method of navigating a vehicle.

2. Description of Related Art

A navigation device for a vehicle performs route guidance. First, the navigation device searches a suitable route from a departure place, e.g., present position, to a destination place for the vehicle. Then, the navigation device displays the suitable route in a road map on a display screen, and a driver drives the vehicle along the suitable route. Before the vehicle passes through a guidance point (e.g., intersection) of the suitable route, a direction (e.g., left or right) to which the vehicle turns is displayed in the road map. At the same time, voice guidance indicates the direction.

However, in this case, the driver of the vehicle has to recognize a relationship between the present position of the vehicle and the guidance point. When the guidance point has no sign, the driver may not be able to recognize the present position as the guidance point.

JP-A-2001-324348 discloses a navigation device for a vehicle. This navigation device helps the driver to recognize the present position as the guidance point, because the voice guidance makes the driver to find a landmark for the guidance point. The landmark is a convenience store or a public building such as a post office, for example.

JP-A-2001-74477 discloses another navigation device. This navigation device displays a three-dimension real image of the guidance point seen from the vehicle, before the vehicle passes through the guidance point. The real image is made of a picture really taken, or a computer graphic (CG) image. The real image is usually displayed on the display screen together with the road map, in order to help the driver to recognize the guidance point.

However, the landmark may disappear, because the convenience store may be closed. Further, a name of the public building may be changed. In these cases, the voice guidance may be incorrect, because the landmark no longer exists. Thereby, the driver may be confused, or drive along a wrong route. Therefore, a map data of the navigation device has to be updated. However, the update of the map data is practically difficult.

Further, the driver needs a certain time for comparing the three-dimension real image with a true view (scenery), because the three-dimension real image has a large amount of information. Thus, a task for the driver may be unnecessarily increased.

SUMMARY OF THE INVENTION

In view of the foregoing and other problems, it is an object of the present invention to provide a navigation device and a method of navigating a vehicle.

According to a first example of the present invention, a navigation device for a vehicle includes a position detector, a controller, a display portion, an imaging portion and an image processor. The position detector outputs a present position of the vehicle. The controller obtains map information from a map database, and performs a guidance of a predetermined route based on the present position of the vehicle and the map information. The display portion displays a road map image based on the map information. The imaging portion images a forward view in front of the vehicle as a forward image from a predetermined distance before a guidance point of the route. The image processor extracts and analyzes visual information of an on-road object from the forward image. The controller specifies a position of the on-road object based on the visual information of the on-road object and the map information of the route. The controller controls the display portion to display and highlight an image of the on-road object at a true position in the road map image, when the position of the on-road object corresponds to the guidance point of the route.

According to a second example of the present invention, a method of navigating a vehicle includes an obtaining step, an imaging step, a specifying step, a displaying step and a performing step. In the obtaining step, a present position of the vehicle and a map information are obtained. In the imaging step, a forward view in front of the vehicle is imaged as a forward image from a predetermined distance before a guidance point of a predetermined route so as to extract a visual information of an on-road object from the forward image. In the specifying step, a position of the on-road object is specified by comparing the visual information with the map information. In the displaying step, a road map image and an image of the on-road object at a true position in the road map image are displayed, when the position of the on-road object corresponds to the guidance point. In the performing step, a route guidance is performed based on the present position of the vehicle and the map information.

Accordingly, a relationship between the guidance point and the present position of the vehicle can be easily and accurately recognized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
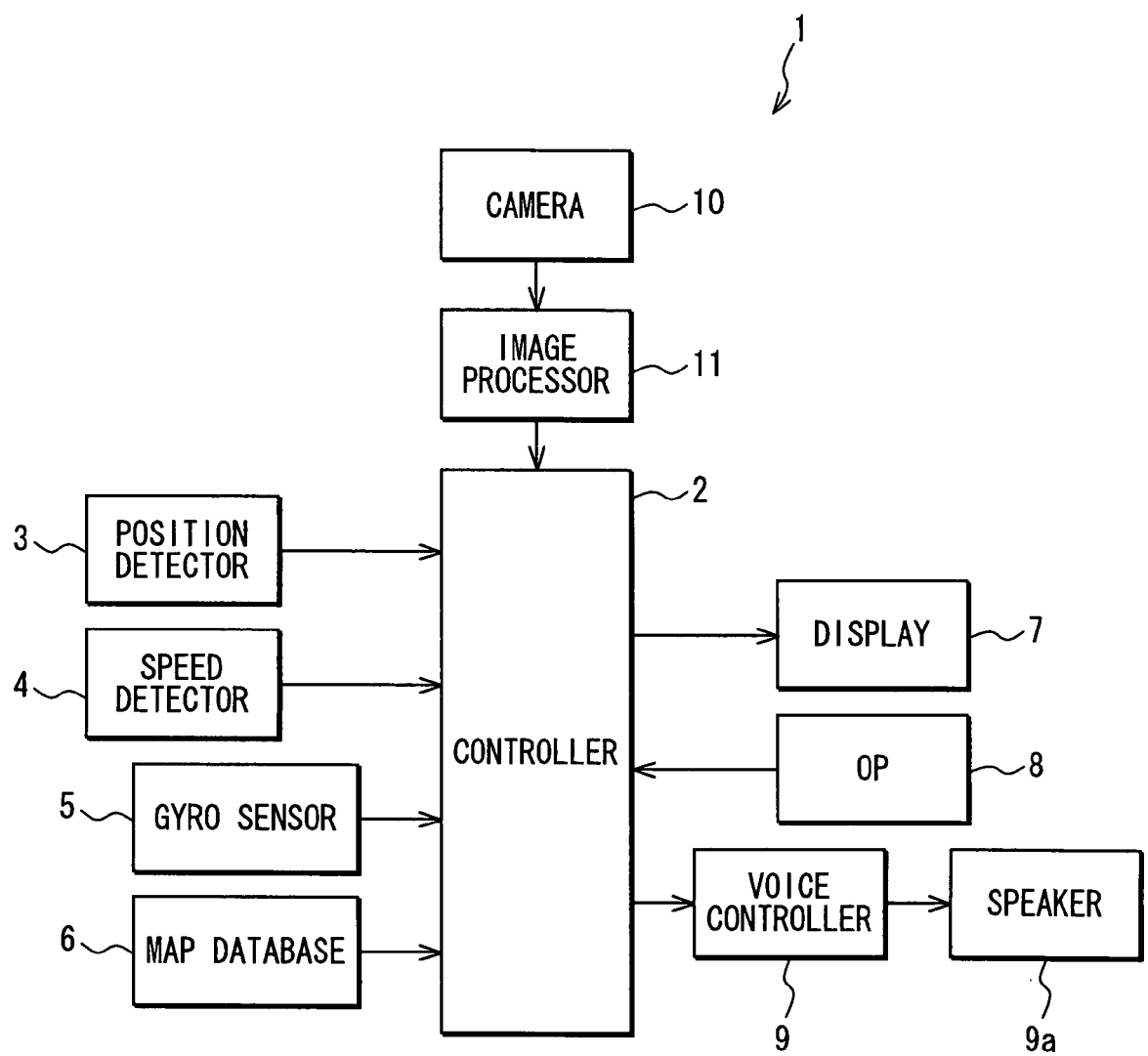
FIG. 1 is a block diagram showing a navigation device according to a first embodiment of the present invention.

A navigation device 1 of a first embodiment will be described with reference to FIGS. 1-4. The navigation device 1 is mounted in a vehicle, and includes a control circuit 2

(controller). A position detector 3 receives a signal output from a satellite for a global positioning system (GPS), and inputs the signal into the control circuit 2 as a present position of the vehicle. A speed detector 4 measures a speed of the vehicle, and inputs a speed signal of the vehicle into the control circuit 2. A gyro sensor 5 detects a yaw rate acted to the vehicle, and inputs the yaw rate into the control circuit 2.

A map database 6 is in electric communication with the control circuit 2, and provides map information for the control circuit 2. The map database 6 is made of a high-capacity data storage medium, e.g., CD-ROM, DVD-ROM, HDD or nonvolatile semiconductor memory. The map database 6 has a variety of data about map drawing, road, intersection, background, place name, landmark name and telephone number. The data of the map drawing is used for displaying a two-dimension or three-dimension map. The data of the road is necessary for map matching, route search and route guidance. The data of the intersection has details of the intersection such as a name of the intersection. The data of the background is used for a background layout in the three-dimension map. The place name is displayed on a display 7 of the navigation device 1. The data of the landmark name has shop names and public facility names, which are arranged in Japanese syllabary order (alphabetically), for example. The telephone number corresponds to the landmark name.

The display 7 is made of color liquid crystal, and is arranged adjacent to a driving seat of the vehicle. The display 7 ordinarily displays a road map, and a magnification of the road map is changeable within plural scales. The display 7 further displays a pointer indicating a position and a heading (driving) direction of the vehicle, and the pointer overlaps with the road map. When route guidance is performed based on route calculation using Dijkstra method, a guidance route is displayed on the display 7, and overlaps with the road map. Further, the display 7 displays a menu screen, a text input screen, a help screen and a variety of message information. An occupant, e.g., driver, of the vehicle inputs a target destination in the input panel, for example.

An operation panel 8 (OP) is operated by the occupant, and an operation command is input into the control circuit 2 through the operation panel 8. The operation panel 8 is made of a mechanical switch adjacent to the display 7, or a touch panel formed on the display 7. Due to the operation panel 8, map magnification can be changed, the operation command can be selected, the target destination can be input, a suitable route can be searched, the route guidance can be started, the present position of the vehicle can be modified, a display screen can be changed, and a volume of a voice guidance can be controlled.

A voice (audio) controller 9 includes a speaker 9a. The control circuit 2 inputs voice (audio) information into the controller 9, and the voice controller 9 outputs the voice information through a speaker 9a. The voice controller 9 is made of a voice synthesis circuit and an amplifier. The voice information includes assistance message for the route guidance and for operating the operation panel 8. The speaker 9a may be a first channel of multi channel speaker of an in-vehicle audio device.

A camera 10 (imaging portion) captures a forward view (scenery) in front of the vehicle as a forward image, and inputs the forward image corresponding to the forward view into an image processor 11. The camera 10 operates for a necessary period, in order to reduce an amount of the image data in the image processor 11. The necessary period starts when the vehicle passes through a predetermined position before a guidance point of the route guidance, and ends when the subject vehicle passes through the guidance point. However, the camera 10 may continue to operate during the route guidance. In addition, the camera 10 is capable of capturing the forward image in a dark place or at nighttime.

The image processor 11 determines that the forward image captured by the camera 10 includes an image of an intersection name sign (on-road object) or not. When the image of the intersection name sign is included in the forward image, the image processor 11 analyzes the image of the intersection name sign, and extracts an intersection name as textual (visual) information. Then, the image processor 11 inputs the textual information into the control circuit 2. The intersection name sign is disposed on a signal of the intersection. The determination by the image processor 11 is based on a comparison between the textual information of the intersection name and the map data in the map database 6.

The control circuit 2 is made of a microcomputer (not shown) having a CPU, a ROM, a RAM, an I/O interface and a bus line. The bus line connects the CPU, the ROM, the RAM and the I/O interface. A navigation program is stored in the ROM. When the navigation program is performed, processed data is temporally stored in the RAM. Further, the RAM temporally has the road map data output from the map database 6, and the textual information output from the image processor 11.

The control circuit 2 highlights the image of the intersection name sign on the display 7, before the vehicle passes through the guidance point. Moreover, the control circuit 2 performs a variety of processes, when the operation command is input into the control circuit 2 through the operation panel 8. For example, the control circuit 2 performs map display, route calculation, route guidance, telephone number search, code number search, Japanese syllabary order landmark search, category search, nearest shop search, destination registration and point place registration. In the code number search, a unique code such as a map code is used, for example. The map code is a trademark of Denso Corporation.

Figure 2:
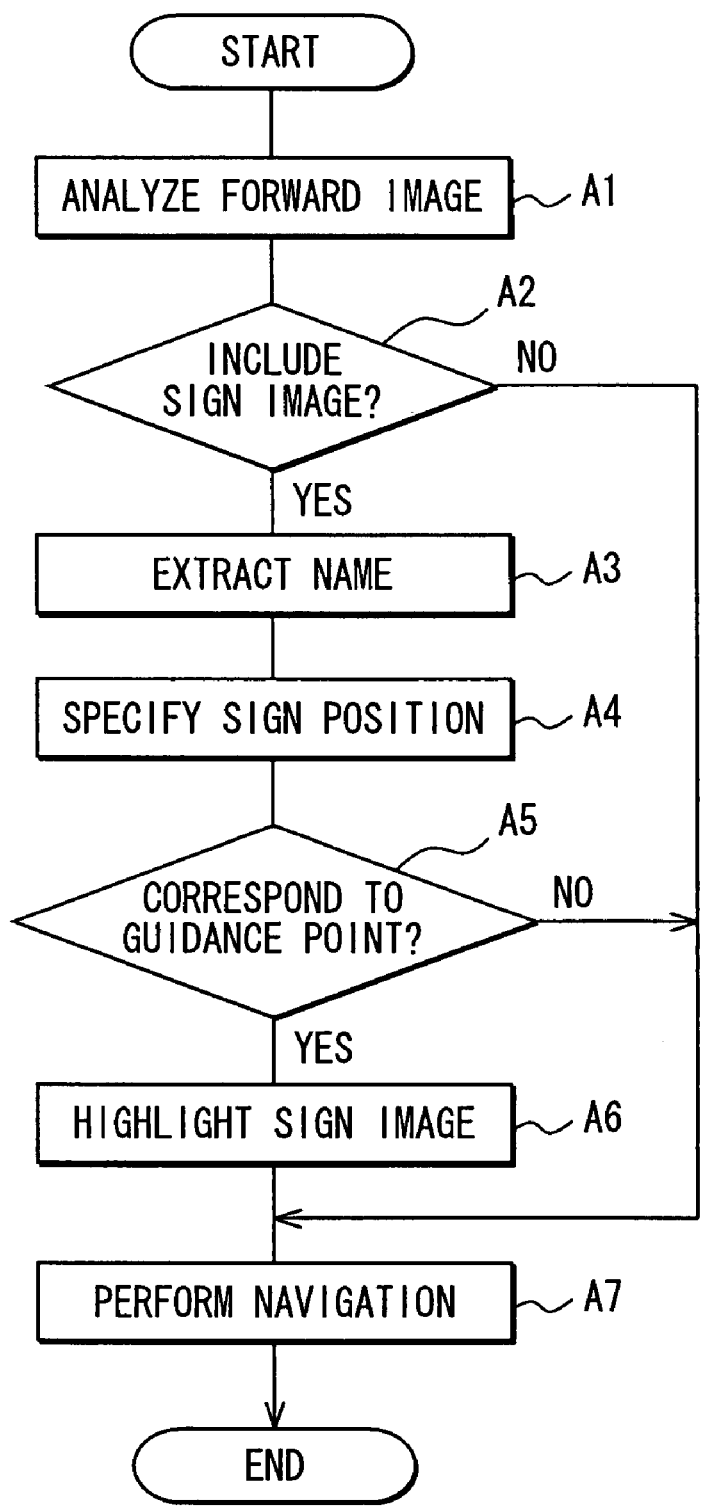
FIG. 2 is a flow chart showing a control of the navigation device.

An operation for highlighting the image of the intersection name sign will be described with reference to FIGS. 2 and 3. As shown in FIG. 2, the image processor 11 analyzes the forward image, that is an image in front of the vehicle captured by the camera 10 (A1), and determines the forward image to include the image of the intersection name sign or not (A2). When the image of the intersection name sign is not included in the forward image (NO at A2), the control circuit 2 performs a navigation process (A7), and returns to an initial state. When the image of the intersection name sign is included in the forward image (YES at A2), the intersection name (i.e., textual information) is extracted, and is input into the control circuit 2 (A3).

The control circuit 2 specifies a position of the intersection name sign by comparing the intersection name with the map date along the guidance route (A4). Then, the control circuit 2 determines the position of the intersection name sign to correspond to the guidance point or not (A5). When the position of the intersection name sign does not correspond to the guidance point (NO at A5), the control circuit 2 performs the navigation process (A7), and returns to the initial state. When the position of the intersection name sign corresponds to the guidance point (YES at A5), the image of the intersection name sign is highlighted on the display 7 (A6). The image of the intersection name sign is either an image captured by the camera 10 or a computer graphic (CG) image. Then, the control circuit 2 performs the navigation process (A7), and returns to the initial state.

Figure 3:
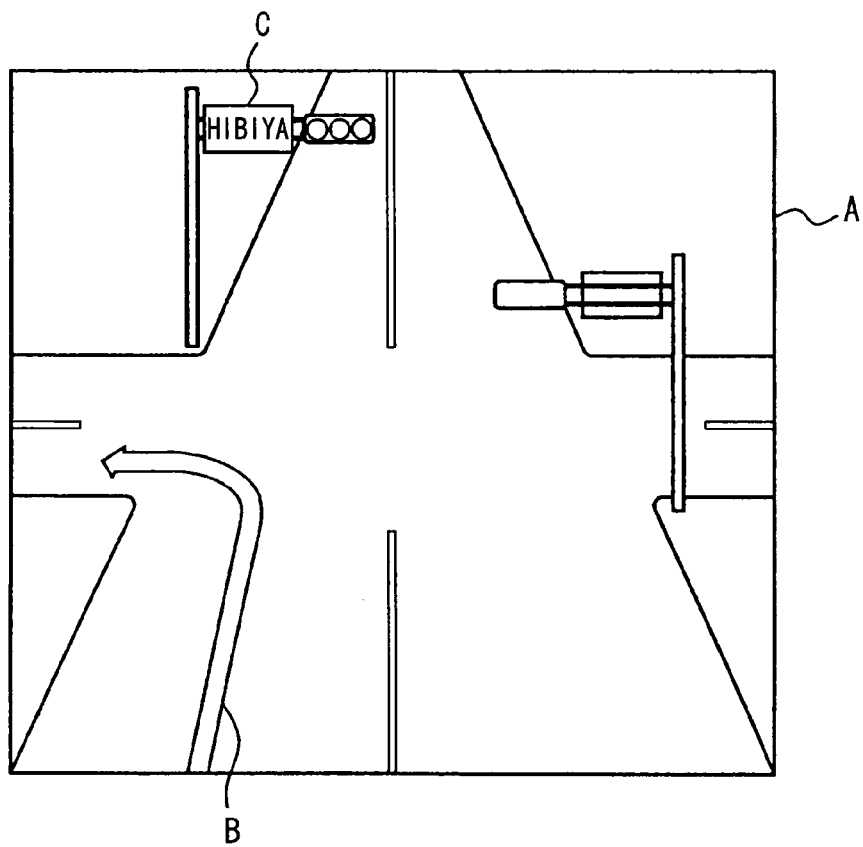
FIG. 3 is a diagram showing a sample image displayed on a display of the navigation device.

FIG. 3 shows an example image on the display 7. A road map image A includes a guidance route B in a predetermined color, and an intersection name sign C. Here, HIBIYA in the intersection name sign C is a place name in Japan, as an example. The road map image A is a three-dimension bird's eye view, for example. The intersection name sign C is arranged at a true position, and highlighted. For example, the intersection name sign C flashes (blinks) on and off.

Figure 4:
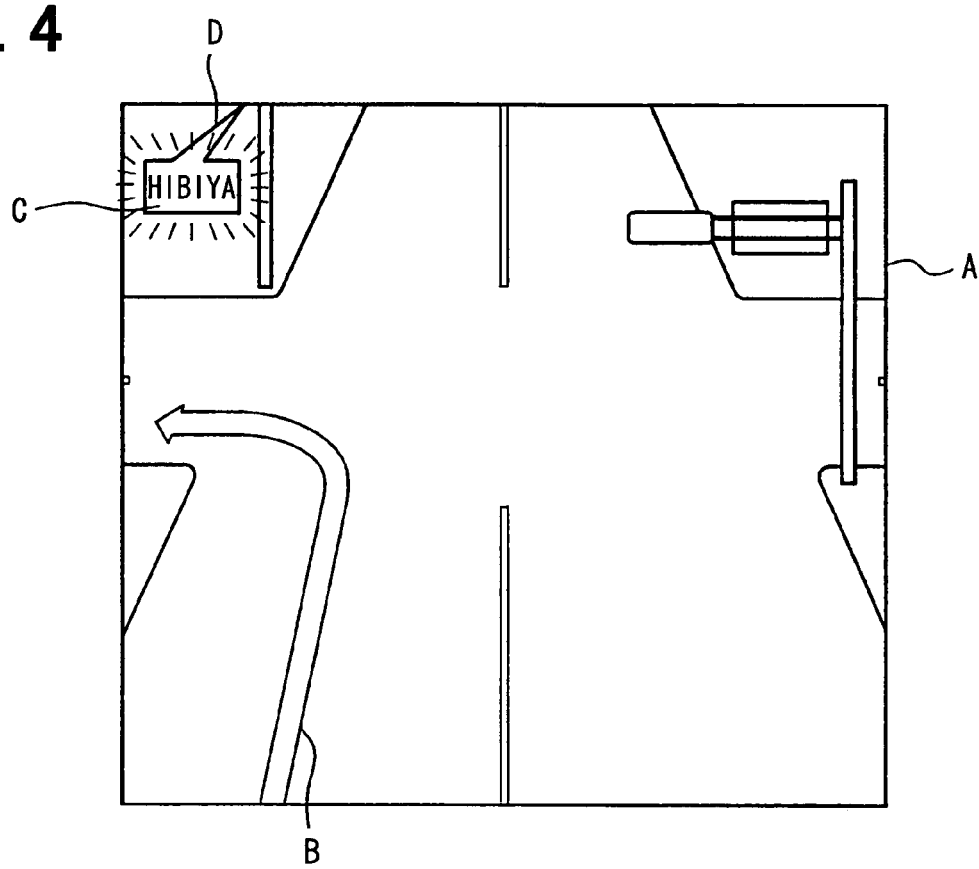
FIG. 4 is a diagram showing another sample image displayed on the display of the navigation device.

In a case in which the image of the intersection name sign C is difficult to be displayed at the true position in the road map image A, the image of the intersection name sign C is arranged at a different position in the road map image A, as shown in FIG. 4. In this case, a balloon D (auxiliary display element) is arranged and highlighted together with the intersection name sign C. Thus, the driver can easily recognize the position of the intersection name sign C.

According to the first embodiment, while the navigation device 1 performs the route guidance, the camera 10 captures the forward image of the vehicle at least from the predetermined position before the guidance point of the route guidance. The image processor 11 determines the forward image to include the image of the intersection name sign or not. When the image of the intersection name sign is included in the forward image, the image processor 11 analyzes the image of the intersection name sign so as to extract the textual information (intersection name), and inputs the extracted result into the control circuit 2. Then, the control circuit 2 compares the intersection name with the map data. Thereby, the control circuit 2 specifies the position of the intersection name sign, and determines the specified position of the intersection name sign to correspond to the guidance point or not. When the position of the intersection name sign corresponds to the guidance point, the image of the intersection name sign is displayed in the road map on the display 7. The image of the intersection name sign is arranged at the true position in the road map, and highlighted.

Therefore, the driver can easily and accurately recognize the image of the intersection name sign in the road map image and a true intersection name sign in the forward view of the vehicle, when the vehicle passes through the guidance point. Thus, the driver can easily and accurately recognize a relationship between the guidance point and the present position of the vehicle in the road map image displayed on the display 7.

Further, when the image of the intersection name sign is positioned outside of the road map image, that is when the image of the intersection name sign is difficult to be displayed at the true position in the road map, the image of the intersection name sign is arranged at a different position in the road map, together with the balloon D. Thus, the driver can easily and accurately recognize the relationship between the guidance point and the present position of the vehicle in the road map image.

Second Embodiment

Figure 5:
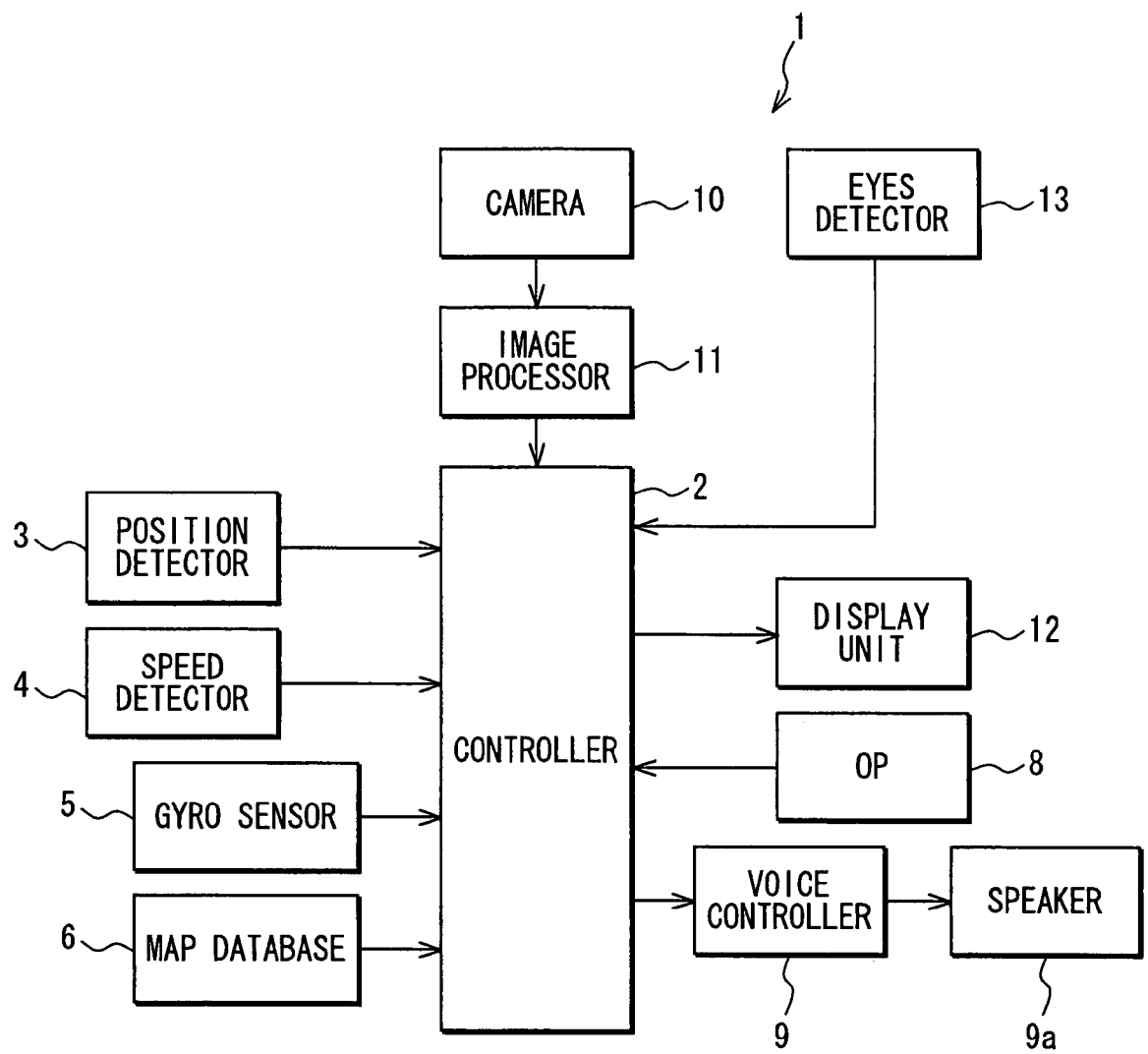
FIG. 5 is a block diagram showing a navigation device according to a second embodiment.

A second embodiment will be described with reference to FIGS. 5-7. A navigation device 1 in the second embodiment includes a display unit 12 in place of the display 7 of the first embodiment. The display unit 12 is controlled by the control circuit 2, and is made of a known head-up display. When the head-up display is used, the driver can see a display such as an indicator with his or her head up. That is, the driver can see a forward view and the indicator at the same time, due to the head-up display. The head-up display includes an image display module and a reflection mirror as a unit. The image display module is a combination module of a color liquid crystal panel and a light source unit, for example. The display unit 12 is disposed on a dashboard corresponding to a position of a driver seat, for example. When image information (e.g., road map or guide line 17 to be described below) is input into the display unit 12, the display unit 12 throws an image of the image information onto a windshield in front of the driver seat. Thus, the display unit 12 displays a virtual image of the image information beyond the windshield.

Alternatively, the display unit 12 may be a transmission display element, e.g., transmission electro luminescence (EL) element, fixed on the windshield. Further, the display unit 12 may be a windshield projector for throwing an image onto the windshield.

The navigation device 1 further includes an eyes detector 13 in the second embodiment. The eyes detector 13 detects an eyes (sight) of the driver. The eyes detector 13 includes a light emitting part, an imaging part, an image processing part and a calculating part, which are not shown. The light emitting part emits infrared light toward a face of the driver. The imaging part converts infrared light reflected by the face of the driver into a visual signal. The image processing part extracts an image of the face of the driver by binarizing and extracting characteristics based on the visual signal. The calculating part detects a sightline direction of the driver and a three-dimension eyes of the driver based on the extracted image. The detected results are input into the control circuit 2.

Figure 6:
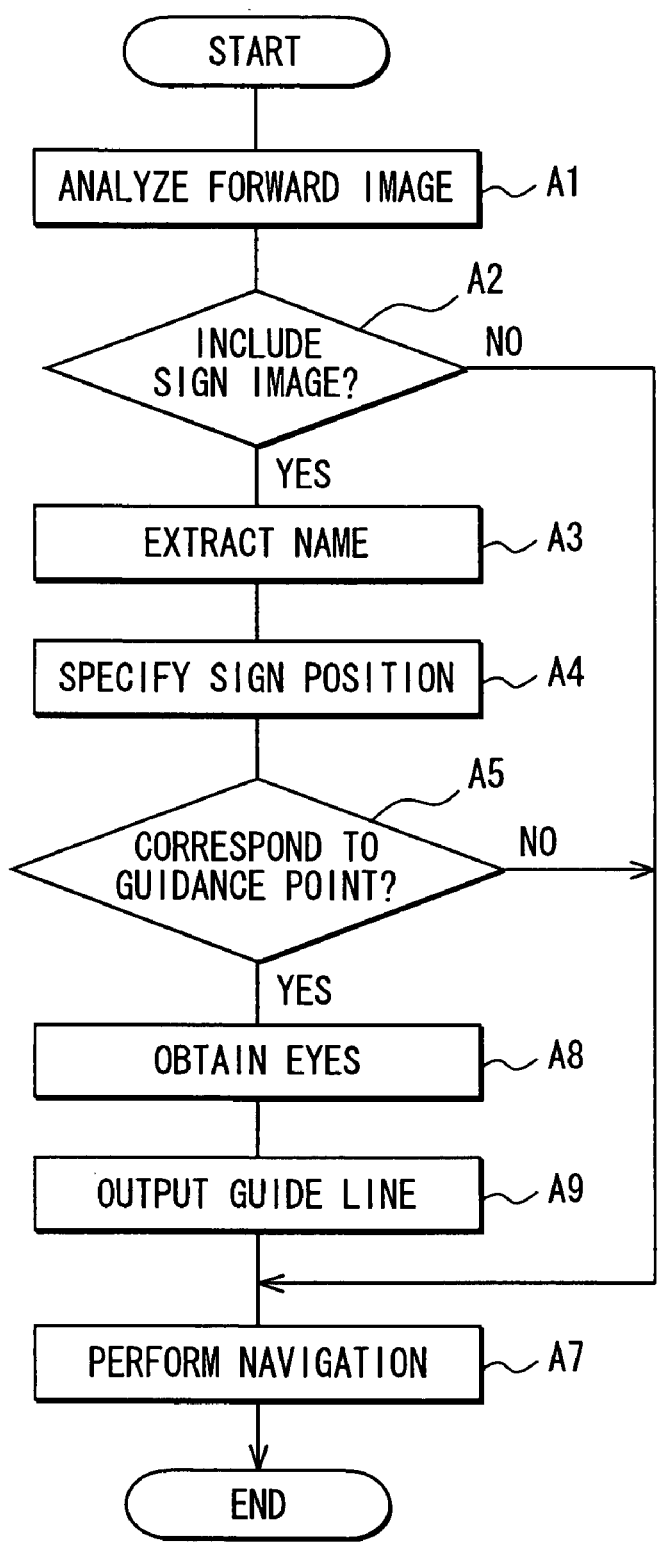
FIG. 6 is a flow chart showing a control of the navigation device.

As shown in FIG. 6, the image processor 11 performs steps A1-A3, and the control circuit 2 performs steps A4 and A5, similarly to the first embodiment. When the position of the intersection name sign corresponds to the guidance point (YES at A5), the control circuit 2 obtains eyes information from the eyes detector 13 (A8). Then, the control circuit 2 forms guide line information, and outputs the guide line information into the display unit 12 (A9). Thereafter, the control circuit 2 performs the navigation (A7), and returns to the initial state.

The guide line information indicates a position of the intersection name sign, when the driver sees the intersection name sign through the windshield. In this case, the driver sees the intersection name sign from the eyes obtained from the eyes detector 13.

Figure 7:
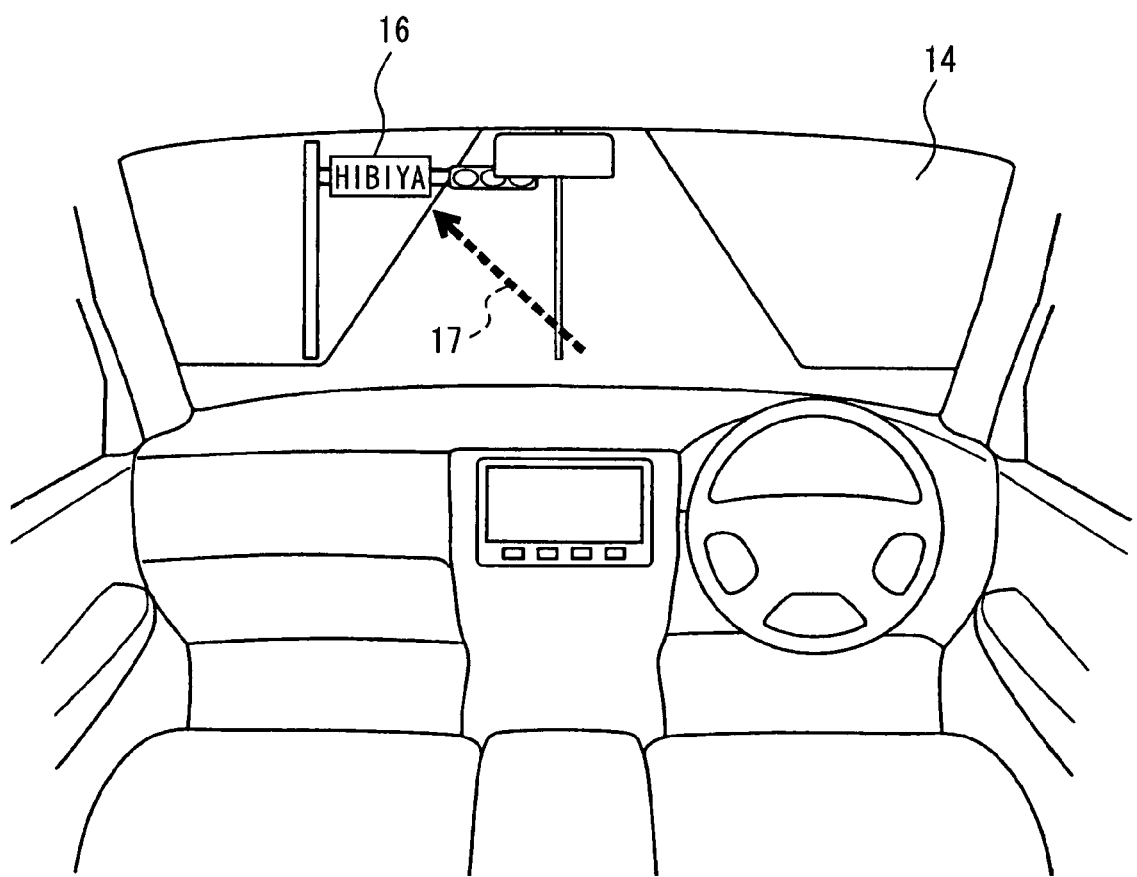
FIG. 7 is a diagram showing a guide line displayed by a display unit of the navigation device.

When the guide line information is input into the display unit 12, the display unit 12 displays a guide line 17, as shown in FIG. 7. FIG. 7 shows a simplified forward view of the driver, and includes a windshield 14, an intersection name sign 16, the guide line 17, a steering wheel, and the like. The guide line 17 is displayed beyond (through) the windshield 14. The guide line 17 is a dashed arrow indicating the position of the intersection name sign 16, for example. The guide line 17 is preferably highlighted. For example, the guide line 17 is flashed on and off, or the dashed arrow is displayed such that the driver feels the dashed arrow flowing toward the intersection name sign 16.

According to the second embodiment, when the vehicle passes through the guidance point, the driver can easily recognize the position of the intersection name sign 16, due to the guide line 17. Thus, a relationship between the guidance point of the route guidance and the present position of the vehicle can be easily and accurately recognized based on the guide line 17 displayed by the display unit 12. Further, when the display unit 12 displays the road map image on or beyond the windshield 14 of the vehicle, moving distance of the eyes of the driver can be reduced. Therefore, the driver can safely keep driving while recognizing the position of the intersection name sign 16.

Other Embodiments

The image of the intersection name sign is extracted from the forward image captured by the camera 10 in the above embodiments. Alternatively, a road information sign arranged at a predetermined distance before an intersection may be extracted. Further, when a shop sign having a logo mark, i.e., pictorial information, is arranged at the intersection, the image processor 11 extracts the logo mark as visual information. The control circuit 2 compares the pictorial information with the road map information of the guidance route. Thereby, the control circuit 2 specifies a position of the shop sign having the logo mark.

When the intersection name sign includes the textual information, the control circuit 2 may convert the textual information into a different textual information in a foreign language, and the different textual information may be highlighted. In this case, when a foreigner not capable of reading Chinese characters drives in Japan, for example, the navigation device 1 can support the foreigner, because the textual information is converted into the corresponding textual information in his or her mother language such as English.

The map database 6 is provided in the navigation device 1 in the above embodiments. However, the map database 6 may not be provided in the navigation device 1. In this case, the map database 6 is provided in a service center capable of wirelessly data-communicating with the vehicle. The navigation device 1 can download necessary map information from the service center by the wireless data-communication.

Such changes and modifications are to be understood as being within the scope of the present invention as defined by the appended claims.

What is claimed is:

1. A navigation device for a vehicle comprising:
   a position detector for outputting a present position of the vehicle;
   a controller for obtaining a map information from a map database, and performing a guidance of a predetermined route based on the present position of the vehicle and the map information;
   a display portion for displaying a road map image based on the map information;
   an imaging portion for imaging a forward view in front of the vehicle as a forward image from a predetermined distance before a guidance point of the route; and
   an image processor for extracting and analyzing a visual information of an on-road object from the forward image, wherein
   the controller specifies a position of the on-road object based on the visual information of the on-road object and the map information of the route,
   the controller determines whether or not the position of the on-road object corresponds to the guidance point of the route, and
   the controller causes the display portion to display and highlight an image of the on-road object at a true position in the road map image, when the controller determines that the position of the on-road object corresponds to the guidance point of the route.

2. The navigation device according to claim 1, wherein
   the image processor extracts a textual information as the visual information.

3. The navigation device according to claim 2, wherein
   the controller converts the textual information into a different textual information in a predetermined language, when the on-road object includes the textual information.

4. The navigation device according to claim 1, wherein the image processor extracts a pictorial information as the visual information.

5. The navigation device according to claim 1, wherein
   the controller controls the display portion to display the image of the on-road object at a position different from the true position in the road map image, when the image of the on-road object is difficult to be displayed at the true position in the road map image, and
   the controller controls the display portion to display an auxiliary display element together with the image of the on-road object such that a driver of the vehicle recognizes the position of the on-road object.

6. The navigation device according to claim 1, wherein
   the display portion is capable of displaying an input image on a windshield of the vehicle.

7. The navigation device according to claim 6, further comprising:
   an eyes detector for detecting an eyes of a driver of the vehicle, wherein
   the controller forms a guide line image indicating the position of the on-road object, when the driver sees the on-road object through the windshield from the eyes detected by the eyes detector, and
   the controller outputs the guide line image into the display portion.

8. The navigation device according to claim 1, wherein
   the display portion is capable of displaying an input image beyond a windshield of the vehicle.

9. The navigation device according to claim 8, further comprising:
   an eyes detector for detecting an eyes of a driver of the vehicle, wherein
   the controller forms a guide line image indicating the position of the on-road object, when the driver sees the on-road object through the windshield from the eyes detected by the eyes detector, and
   the controller outputs the guide line image into the display portion.

10. The navigation device according to claim 1, wherein
    the image processor determines the forward image to include an intersection name sign or not,
    the image processor extracts an intersection name, when the image of the intersection name sign is included in the forward image,
    the controller performs a navigation, when the intersection name sign is not included in the forward image.

11. The navigation device according to claim 1, wherein
    the controller performs a navigation, when the position of the on-road object does not correspond to the guidance point.

12. The navigation device according to claim 1, wherein
    the road map image is a three-dimension view.

* * * * *